United States Patent
Borish et al.

(10) Patent No.: US 12,378,503 B1
(45) Date of Patent: *Aug. 5, 2025

(54) GENERAL PURPOSE GLYCERIDE-BASED CLEANER SYSTEM

(71) Applicant: Ethox Chemicals, LLC, Greenville, SC (US)

(72) Inventors: Edward T. Borish, Greenville, SC (US); Charles F. Palmer, Jr., Greenville, SC (US); Marnie Roussel, Greenville, SC (US); William Burton Davis, III, Greenville, SC (US); Stephanie Anderson, Greenville, SC (US)

(73) Assignee: Ethox Chemicals, LLC, Greenville, SC (US)

(*) Notice: Subject to any disclaimer, the term of this patent is extended or adjusted under 35 U.S.C. 154(b) by 672 days.

This patent is subject to a terminal disclaimer.

(21) Appl. No.: 17/742,915

(22) Filed: May 12, 2022

Related U.S. Application Data

(63) Continuation-in-part of application No. 17/468,858, filed on Sep. 8, 2021, now Pat. No. 11,692,107, which is a continuation-in-part of application No. 17/072,318, filed on Oct. 16, 2020, now Pat. No. 11,491,094.

(60) Provisional application No. 62/923,227, filed on Oct. 18, 2019.

(51) Int. Cl.
| | |
|---|---|
| *C11D 3/20* | (2006.01) |
| *C11D 1/10* | (2006.01) |
| *C11D 1/14* | (2006.01) |
| *C11D 1/66* | (2006.01) |
| *C11D 1/83* | (2006.01) |
| *C11D 3/382* | (2006.01) |

(52) U.S. Cl.
CPC .............. *C11D 3/2093* (2013.01); *C11D 1/83* (2013.01); *C11D 3/382* (2013.01); *C11D 1/10* (2013.01); *C11D 1/146* (2013.01); *C11D 1/662* (2013.01); *C11D 2111/12* (2024.01); *C11D 2111/18* (2024.01); *C11D 2111/24* (2024.01)

(58) Field of Classification Search
CPC ......... C11D 3/2093; C11D 1/83; C11D 3/382; C11D 2111/12; C11D 2111/18; C11D 2111/24; C11D 1/10; C11D 1/146; C11D 1/662
See application file for complete search history.

(56) References Cited

U.S. PATENT DOCUMENTS

| | | | |
|---|---|---|---|
| 4,353,745 A | 10/1982 | Ebbeler | |
| 5,024,780 A | 6/1991 | Leys | |
| 5,346,640 A | 9/1994 | Leys | |
| 6,017,968 A | 1/2000 | Beggs et al. | |
| 6,824,623 B1 | 11/2004 | Gross et al. | |
| 2011/0232668 A1* | 9/2011 | Hoffmann | A61K 8/44 424/70.13 |
| 2013/0189198 A1* | 7/2013 | Tamareselvy | A61K 8/44 514/772.6 |
| 2015/0225675 A1* | 8/2015 | Robinson | C09D 133/08 510/109 |

FOREIGN PATENT DOCUMENTS

EP   0681508   12/1993

OTHER PUBLICATIONS

Solvent Systems International, Inc.; "Biobased Graffiti Remover", product data sheet; www.solvent-systems.com.
Solvent Systems International, Inc.; "Biobased Graffiti Remover", Safety data sheet; Jan. 8, 2018.
Solvent Systems International, Inc.; "Biobased Graffiti Remover", Safety data sheet; Revised Mar. 6, 2018.
Purasolve;"Graffiti Remover", product data sheet; www.envirofluid.com.
Purasolve;"Graffiti Remover", safety data sheet; Feb. 27, 2017.
Bio-Solv; Bio Brands; Safety Data Sheet; Revised May 29, 2015.
Prosoco; Sure Klean Graffiti Remove; Product data sheet; copyright: 2021.

\* cited by examiner

*Primary Examiner* — Angela C Brown-Pettigrew
*Assistant Examiner* — Mustafa Humbel Ahmed
(74) *Attorney, Agent, or Firm* — Joseph T. Guy; Patent Filing Specialist Inc.

(57) ABSTRACT

A cleaning system and a method of cleaning are provided. The cleaning system comprises a liquid comprising 4-50 wt % glyceride wherein the glyceride is the condensation reaction product of at least 1.10 moles of a mixture of acids to no more than 2.1 moles of the mixture of acids per mole of glycerin. The mixture of acids comprises at least 0.275 to no more than 0.990 moles of a first acid comprising a branched acid with 16-20 aliphatic carbons; at least 0.250 to no more than 0.810 moles of a second acid comprising an alkyl acid with 9-11 carbons and at least 0.250 to no more than 0.810 moles of a third acid comprising an alkyl acid with 7-9 carbons. The third acid has a lower molecular weight than the second acid. The cleaning system also has 6-45 wt % surfactant, optionally up to 90 wt % cleaning agent and up to 90 wt % solvent. The liquid has a BYV of at least 50 dyn/cm².

64 Claims, No Drawings

GENERAL PURPOSE GLYCERIDE-BASED CLEANER SYSTEM

CROSS-REFERENCE TO RELATED APPLICATIONS

The present invention is a continuation-in-part of pending U.S. patent application Ser. No. 17/468,858 filed Sep. 8, 2021 which is, in turn, a continuation-in-part of pending U.S. patent application Ser. No. 17/072,318 filed Oct. 16, 2020 which, in turn, claims priority to U.S. Provisional Patent Application No. 62/923,227 filed Oct. 18, 2019 all of which are incorporated herein by reference.

FIELD OF THE INVENTION

The present invention is related to a cleaning system. More specifically, the present invention is related to a cleaning system comprising a composition capable of removing graffiti, grass, dirt, food products, greases, oils, soils, general stains and other materials from a variety of surfaces.

BACKGROUND

There is an on-going need for improved compositions for cleaners. A particular aspect of this on-going desire is compositions that are water based, water soluble, nonflammable, vegetable-derived, biodegradable and with low irritancy, low toxicity, and low VOCs. For example, sulfate-based surfactants are known to be an irritant to mucosal membranes and particularly those membranes associated with the eyes, the skin and the lungs. It has therefore been a societal desire to decrease or remove sulfate-based surfactants from products, particularly liquid products, that can come into contact with the hair and skin of people using the product or in the vicinity of the product being used.

Of particular importance to consumers is viscosity. It is desirable that cleaning products have a viscosity that makes the product easy to control during application and which does not flow to unintended areas. If the viscosity is too low the product spreads quickly and the cleaning agents incorporated therein do not have sufficient time to adequately dislodge the undesirable materials from the surface being cleaned.

With sulfate-based surfactants, and non-aqueous solvent-based systems, viscosity is easily controlled by salts. In these systems the viscosity generally increases with concentration of salt, within the working range, even up to a viscosity sufficient to form a solid, non-flowable gel. As set forth in U.S. Published Patent Application No. 2009/0257968, particularly suitable salts for increasing viscosity contain cations such as alkali metals, particularly sodium and potassium; and alkaline earth metal salts, such as magnesium and aluminum. However, salts are not effective in controlling the viscosity of non-sulfate aqueous based systems. This has led to efforts to develop a surfactant system suitable for controlling the viscosity of liquid compositions which have a low concentration of sulfate or which are sulfate-free.

Provided herein is an, optionally sulfate-free, surfactant system suitable for use with cleaning products and the like without limit thereto. The present invention provides a natural-based thickener which is particularly suitable for use in, preferably sulfate-free, cleaning systems, and the like, and which provides a composition with non-Newtonian rheology.

SUMMARY OF THE INVENTION

The present invention is related to a cleaning system which is optionally and preferably sulfate-free.

More specifically, the present invention is related to a cleaning system comprising a thickener which can provide a non-Newtonian liquid with shear thinning properties.

A particular feature of the invention is the ability to clean material from a surface such as graffiti, grass, dirt, food products, greases, oils, soils, general stains and other materials from a variety of surfaces including hard surfaces and soft surfaces including, but not limited to, natural and synthetic fabric.

A particular feature of the invention is a thickener, based on natural products, which can be used in a sulfate-free liquid surfactant system which is biologically compatible and safe.

These and other embodiments, as will be realized, are provided in a method of cleaning a surface comprising:
  providing cleaning system comprising:
  a liquid comprising:
  4-50 wt % glyceride wherein the glyceride is the condensation reaction product of at least 1.10 moles of a mixture of acids to no more than 2.1 moles of the mixture of acids per mole of glycerin;
  wherein the mixture of acids comprises:
  at least 0.275 to no more than 0.990 moles of a first acid comprising a branched acid with 16-20 aliphatic carbons;
  at least 0.250 to no more than 0.810 moles of a second acid comprising an alkyl acid with 9-11 carbons; and
  at least 0.250 to no more than 0.810 moles of a third acid comprising an alkyl acid with 7-9 carbons wherein the third acid has a lower molecular weight than the second acid;
  and 6-45 wt % surfactant; and
  up to 90 wt % solvent;
  applying the cleaning system to a surface comprising a material to be removed; and removing the cleaning system.

DESCRIPTION

The present invention is related to a cleaning system and more specifically a cleaning system with low sulfate or which is sulfate-free. More specifically, the present invention is related to a cleaning system comprising natural based glyceride or glyceryl ester which is particularly suitable as a thickener for, preferably sulfate-free, liquid surfactant systems which are non-Newtonian liquids.

Of particular interest in the present invention is the ability to remove unwanted surface coatings formed by graffiti, grass, dirt, food products, greases, oils, soils, paints and markers, specifically permanent markers, water-based and organic solvent-based paints, general stains and other materials especially those based on lacquers and acrylics. The instant invention provides a cleaning system comprising a carrier, an optional but preferred cleaning agent, and an optional but preferred solvent. The carrier provides viscosity thereby maintaining the cleaning agent in proximity with the surface being cleaned to solubilize, dissolve, weaken or alter the composition of the materials to be removed or disrupt the bonding of the materials to be removed from the surface thereby allowing for removal with, preferably, water.

The cleaning system can be applied to a surface by any means common in the art such as by painting with a brush or roller, spraying or applying with a cloth with painting being a particularly suitable method for demonstration of the invention.

The carrier comprises a glyceride, also referred to as glyceride esters or glyceryl esters, and a solvent. The glyceride is formed as the reaction product of glycerin with a molar excess of a mixture of acids. The molar excess provides, on average, primarily mono and diglyceride esters. More specifically, the molar excess is at least a 10% molar excess to no more than 110% molar excess. Even more specifically, for one mole of glycerin at least 1.10 moles of the mixture of acids is used to no more than 2.10 moles of the mixture of acids. Below about 1.10 moles of the mixture of acids per mole of glycerin the number of diglyceride esters, based on statistical distribution, is insufficient for the surfactant to provide sufficient thickening efficiency at reasonable concentrations. Above about 2.10 moles of the mixture of acids per mole of glycerin the number of triglyceride esters, based on statistical distribution, increases and is no longer a surfactant suitable for the intended purpose.

The mixture of acids comprises three acids with the first acid having a higher molecular weight than the second acid wherein the second acid has a higher molecular weight than the third acid. The first acid is preferably a branched acid comprising 16-20 aliphatic carbons and preferably 18 aliphatic carbons. Particularly preferred as the first acid is a methyl branched aliphatic carbon with 16-methylheptadecanoic acid being particularly preferred. The second acid is preferably an alkyl acid of 9-11 carbons which are preferably unbranched and more preferably the second acid is decanoic acid. The third acid is preferably an alkyl acid of 7-9 carbons which are preferably unbranched and more preferably the third acid is octanoic acid.

The mixture of acids comprises, per mole of glycerin, at least 0.275 to no more than 0.990 moles of the first acid; at least 0.250 to no more than 0.810 moles of the second acid and at least 0.250 to no more than 0.810 moles of the third acid. More preferably, the mixture of acids comprises, per mole of glycerin, at least 0.425 moles of the second acid, even more preferably at least 0.520 moles of the second acid, even more preferably no more than 0.580 moles of the second acid. More preferably, the mixture of acids comprises, per mole of glycerin, at least 0.425 moles of the third acid, even more preferably at least 0.520 moles of the third acid, even more preferably no more than 0.580 moles of the third acid.

The cleaning system comprises at least 4 wt % glyceride to no more than 50 wt % glyceride and at least 6 wt % surfactant to no more than 45 wt % surfactant and up to 90 wt % solvent. Below about 4 wt % glyceride the thickening properties are insufficient and above about 50 wt % glyceride an insufficient amount of cleaning agent is available for optimum performance.

The cleaning system preferably comprises at least 10 wt % to no more than 95 wt % carrier and 5 wt % to no more than 90 wt % cleaning agent with the balance being solvent. A particularly preferred solvent is water.

Cleaning agents include, without limit thereto: esters, preferably alkyl esters with up to 5 carbons which may be substituted and preferably methyl and ethyl esters, 3-ethoxypropionic ethyl ester, ethyl lactate, soy methyl ester, triglyceride methyl ester, and $C_{1-4}$ alkyl ester of a $C_{6-22}$ saturated or unsaturated carboxylic acid; propylene carbonate; terpenes, particularly cyclic terpenes and preferably limonene; N-methylpyrrolidone; acetates such as dipropylene glycol methyl ether acetate or dipropylene glycol monomethyl ether acetate, diethylene glycol monoethyl ether acetate; ethyl acetate, n-propyl acetate, n-butyl acetate and isobutyl acetate; ethers such as dipropylene glycol methyl ether or diethylene glycol ethyl ether.

A particularly preferred embodiment comprises a mixture of: 10-30 wt % glyceride; 20-40 wt % surfactant and 30-70 wt % cleaning agent with the balance being solvent and other additives as desired.

A particularly preferred glyceride comprises the reaction of glycerin with isostearic acid, octanoic acid and decanoic acid.

The reaction of the mixture of acids and glycerin provides a statistical mixture of esters with each ester being the product of a condensation reaction between one randomly selected hydroxyl group on a glycerin molecule and one of either the first acid, second acid or third acid. It is assumed that all acid molecules react and therefore the average number of esters formed per glycerin molecule is approximately the molar ratio of mixed acid to glycerin, which is 1.1 to 2.1. By way of non-limiting example if 1.5 moles of mixed acid is reacted with 1 mole of glycerin the average number of esters per glycerin molecule is defined as 1.5.

The glyceride provides viscosity and the desired shear thinning rheology properties without sacrificing foam properties of the surfactant. It also adds lubricity and emolliency to the finished product thereby allowing the formulator to reduce additional ingredients to achieve preferred aesthetics in the finished product.

The glyceride is formed by heating glycerin and the prescribed mixture of acids under nitrogen with mixing, preferably to an initial temperature of 160° C. Then the temperature is preferably increased about 10° C. every hour until reaching about 220° C. Samples are preferably taken every 4 hours until the reaction is complete, followed by cooling to about 40-50° C. and filtering.

The cleaning system can be made either by mixing the surfactants with the glyceride followed optionally by the addition of the mixture to the solvent, which is preferably water, followed optionally by addition of a cleaning agent, the addition optionally of solvent to the surfactant/glyceride mixture followed optionally by addition of a cleaning agent or all components can be added at the same time, heated and stirred preferably for about 10 minutes. Alternatively, the glyceride and optional cleaning agent can be premixed and then added to the surfactant followed optionally by addition of solvent which is preferably water. Another option is to first add the surfactant to the solvent which is preferably water followed by addition of the glyceride and then the optional cleaning agent or by addition of a premix of the glyceride and optional cleaning agent. Depending on the particular composition of preparation method heat may or may not be required. These examples are not meant to be limiting and one of ordinary skill in the art may envision other preparation methods.

A particular feature of the claimed invention is the surprising and unexpected ability to provide a non-Newtonian liquid with shear-thinning properties which provides a satisfactory feel when used by consumers. A liquid that has a lower viscosity under high shear than under low shear has shear-thinning rheology. When used in personal hygiene and cleaning products this provides many benefits. The liquid can be dispensed through an orifice, since the viscosity lowers under the higher shear stress of the orifice. However, the viscosity increases once dispensed and therefore the liquid can be applied with minimal flow. Furthermore, the non-Newtonian liquid will suspend bubbles or particulate therein during storage thereby reducing the settling that occurs in the absence of this type of Rheology.

Shear-thinning is quantified by the Brookfield Yield Value (BYV) which is calculated by the equation:

$$BYV = 2r_1(n_1 - n_2)/100$$

wherein $n_1$ and $n_2$ are the viscosities at two different spindle speeds, $r_1$ and $r_2$, wherein $r_2/r_1 = 2$. BYV is reported as dyn/cm². For the purposes of this invention BYV is measured at ambient temperature, about 25° C. Viscosities were determined at spindle speeds of 10 and 20 rpm using a Brookfield DV-II+ Viscometer and reported as centipoise (cps). A positive BYV indicates shear-thinning. For the purposes of the present invention a BYV of at least 50 dyn/cm² is preferred such that any particles of cleaning agent can be suspended. It is more preferable that the shear-thinning be at least 100 dyn/cm². Above a BYV of about 100 dyn/cm² the liquid can suspend particles with an average particle diameter of 0.6 mm such as sand. It is preferable that the BYV not exceed 100,000 dyn/cm².

In some instances the liquid may also be rheopectic as evidenced by a time-dependent shear thickening.

A particularly preferred surfactant system comprises the glyceride and at least one surfactant which is defined as a compound which lowers the surface tension of a liquid. Preferred surfactants are selected from an anionic surfactant, a cationic surfactant, a nonionic surfactant and an amphoteric surfactant.

Preferred anionic surfactants include glutamates, taurates, alkanoyl isethionates, alkyl succinates, alkyl sulphosuccinates, N-alkoyl sarcosinates, alkyl phosphates, alkyl ether phosphates, alkyl ether carboxylates, alpha-olefin sulphonates wherein alkyl and acyl groups are preferably 8 to 18 carbons which may be unsaturated. Particularly preferred alpha-olefin sulphonates include the sodium, magnesium, ammonium and mono-, di- and triethanolamine salts thereof. Particularly preferred anionic surfactants include sodium oleyl succinate, ammonium lauryl sulphosuccinate, disodium laureth sulfosuccinate, sodium dodecylbenzene sulphonate, triethanolamine dodecylbenzene sulphonate, sodium cocoyl isethionate, sodium lauroyl isethionate, sodium N-lauryl sarcosinate, sodium lauroyl lactylate, sodium lauroyl glutamate, sodium methyl cocoyl taurate, sodium lauroyl methyl taurate, sodium lauriminodipropionate and mixtures thereof.

Particularly preferred cationic surfactants include quaternized amines, quaternized polysaccharides, alkyl polysaccharides, alkoxylated amines, alkoxylated ether amines, phospholipids, phospholipid derivatives, and mixtures thereof.

Preferred nonionic surfactants include polyalkylene glycol adducts of alcohols, acids & glycerides, polyglycerin adducts of acids & alcohols, alkyl glucosides, sorbitan esters, fatty acid amides, and polyoxyethylene, polyoxypropylene block copolymers, in particular, the following surfactants, alone or as mixtures. Particularly preferred nonionic surfactants include polyalkylene glycol adducts of alkyl C8-C24 phenols; polyalkylene glycol adducts of C8-C30 alcohols or C8-C30 glycosides, linear or branched, saturated or unsaturated; polyalkylene glycol adducts of C8-C30, linear or branched, saturated or unsaturated fatty acid amides; C8-C30 linear or branched, saturated or unsaturated esters of sorbitol, which are preferably polyalkylene glycol adducts; fatty acid esters of sucrose; C8-C30 alkyl polyglycosides; C8-C30 alkenyl polyglycosides, which are optionally polyalkylene glycol adducts with from 0 to 10 polyalkylene glycol units and comprising from 1 to 15 glucose units; polyalkylene glycol adducts of saturated or unsaturated vegetable oils; derivatives of N-alkyl (C8-C30) glucamine; derivatives of N-acyl C8-C30 methylglucamine; aldobionamides; amine oxides; polyalkylene glycol adducts of silicones; polyglycerin adducts of lauryl alcohol containing 1-7 moles of glycerin; polyglycerin adducts of oleyl alcohol containing 1-7 moles of glycerin; polyglycerin adducts of cetearyl alcohol containing 1-7 moles of glycerin; polyglycerin adducts of octadecanol containing 1-7 moles of glycerin and alkyl glucosides including without limitation decyl glucoside, lauryl glucoside, coco glucoside, and caprylic/capric glucoside.

Particularly preferred amphoteric surfactants include cocamidopropyl hydroxysultaine, cocamidopropyl betaine and cocobetaine, the sodium salt of diethylaminopropyl laurylaminosuccinamate or mixtures thereof.

The present invention is suitable for use in any application desiring thickening of a sulfate-free surfactant system. The present invention is particularly suitable for cleaning a surface but is also suitable without limitation for use in cleaning surfaces including metal surfaces, porous surfaces, ceramic surfaces, smooth surfaces, painted surfaces, and natural surfaces such as cellulose based materials.

Without limit thereto, the present invention is particularly useful in applications such as an oven and stove cleaner, a grill and grate cleaner, a degreaser for hard and soft surfaces, a fabric spot remover, a tile and grout cleaner, a bug remover, a tar remover and in a paint stripper, a toilet cleaner, a sealed floor cleaner including wood, laminate, vinyl & tile, and in dish washing. However, the instant invention has been demonstrated to be suitable for use on plastic or urethane finished wood without damage to the surface.

In use, the cleaning system is applied to a surface to be cleaned. The cleaning system will form a viscous coating on the surface which allows the cleaning agent of to interact with the material being cleaned from the surface. After a sufficient amount of time, typically 5 minutes to 10 hours, the cleaning system is removed. The process can be repeated multiple times if desired. Removal of the cleaning system can be accomplished by wiping with a cloth, air impingement, or by flowing solvent, preferably water. The water can be applied by pouring or spraying. In a preferred embodiment the water is applied by spraying under pressure.

Other additives can be added to the cleaning system to improve aesthetic properties or for additional functionality. Fragrances, colorants, opacifiers, chelating agents, abrasives, anti-deposition agents, brightening agents, UV-absorbers, preservatives, antioxidants, lubricants, penetrants, film formers, detergents, emulsifiers, volatiles, propellants, salts, pH adjusting agents, neutralizing agents, buffers, antistatic agents, absorbents, and combinations thereof can be employed.

Throughout the specification the term "Cx" refers to x carbons. By way of non-limiting example, C8 refers to a specified group with eight carbons.

For the purposes of the present invention cleaning agents refer to those substances which are intended for use to clean and remove material from a surface, particularly a porous surface, such as concrete, metal or a painted surface.

For the purposes of the present invention the term "sulfate-free" refers to a surfactant system comprising less than 2 wt % sulfate-based surfactant, preferably less than 1 wt % sulfate-based surfactant and most preferably less than a measurable amount of sulfate-based surfactant. A sulfate-based surfactant is one characterized by the following chemical structure:

$$R-OSO_3^{-1}$$

where R is a lipophilic group.

Listed ranges for composition are inclusive and include every number with the same number of significant figures in the range. By way of non-limiting example, a stated range of 0.001 to 0.010 would include 0.001, 0.002, 0.003, 0.004, 0.005, 0.006, 0.007, 0.008, 0.009 and 0.010.

In use, contact times can be several minutes to an hour to several hours. One treatment may be sufficient to clean the surface but multiple applications may be necessary for particularly tenacious materials. In general, a preferred method of use is to allow the composition to remain in contact with the soiled substrate and then simply rinse with running water or wipe clean, as for example, with a damp sponge. The composition has the advantage of clinging to vertical surfaces, as for example the walls of an oven. This same property seems to overcome the problem of "wicking" when using solvents in removing stains from cloth.

EXAMPLES

Preparation of Esters:

Ester 1 would be prepared by reacting 1 mole of glycerin (99.7%) with 2 moles of a mixture of acids where the acid mix comprises 25 wt % isostearic acid and 34 wt % octanoic acid and 41 wt % decanoic acid. The glyceride is formed by heating glycerin and the prescribed mixture of acids under nitrogen with mixing, preferably to an initial temperature of 160° C. Then the temperature is preferably increased about 10° C. every hour until reaching about 220° C. Samples are preferably taken every 4 hours until the reaction is complete, followed by cooling to about 40-50° C. and filtering Ester 2 would be prepared by the same procedure as Ester 1 using slightly more than 1 mole of a mixture of acids where the acid mix is 36 wt % isostearic acid and 32 wt % octanoic acid and 32 wt % decanoic acid.

Ester 3 would be prepared by the same procedure as Ester 2 with 26 wt % isostearic acid, 22 wt % octanoic acid and 22 wt % decanoic acid per mole of glycerin.

Preparation of Mixtures:

Example 1

25 grams of limonene or soy methyl ester was mixed with 15 grams of Ester 3 and heated to about 50-60° C. with mixing for several minutes. The mixture was then added to an aqueous solution of decyl glucoside (50% active) with mixing resulting in a thick cream having a composition which is decyl glucoside 30% active, Ester 3 15%, soy methyl ester or limonene 25%, and water 30%.

Example 2

17.5 grams of Ester 3 was added to 62.5 grams of an aqueous solution of decyl glucoside (50% active) at room temperature. To this mixture was added 20 grams of limonene or soy methyl ester with mixing at room temperature resulting in a thickened mixture. Both example mixtures were tested as follows and found be effective in removing graffiti. Apply (spread, brush, roll) product to surface to be treated, for example subway tile. After 30 minutes brush lightly then reapply more product. After 30 minutes brush lightly again then rinse with running water, preferably using a power washer along with additional brushing if necessary. Finally, rinse clean.

Example 3. Oven and Stove Cleaner

The mixture of Example 1 made using soy methyl ester was placed on the soiled porcelain enamel surface of an electric oven. After about 1 hour at room temperature a green plastic scrub pad was used to gently scrub the surface for several seconds. The area was then simply wiped clean using a moist kitchen sponge. The soil could not be removed by scrubbing and rinsing in the absence of the graffiti remover.

Example 4. Cleanser for Removing Baked-on/Polymerized Grease from Tile

The mixture of Example 3 was applied to the vertical tile backsplash of a kitchen stove coated with baked-on/polymerized grease that could not be removed using convention hard surface cleaner. After about an hour the treated surface was wiped clean with a damp kitchen sponge.

Example 5. Cleanser for Removing Paint from Fabric

The mixture of Example 3 was applied using cotton swabs to cotton fabric with paint that was dried on for over a year. After about 10 minutes the fabric was rinsed briefly under running and the paint was found to be completely removed.

Example 6. Water-Proof Mascara

A portion of fabric (94% polyester & 6% spandex) about 1 in$^2$ had mascara, L'Oreal Voluminous Lash Paradise, black water proof applied to it. Then mixture of Example 3 was applied. After about an hour the fabric was rinsed under running water with gentle rubbing by hand. Most but not of the mascara was removed. However, after a second application as above the mascara was completely removed.

Example 7. Lipstick

A portion of the same fabric as above in Example 3 was treated with lipstick with the same results as above.

Example 8. Grass and Dirt

Cotton fabric with ground in grass and dirt stains was treated as in Example 3 with the same results as above.

Example 9. Blood

Samples of both cotton and polyester fabric stained with blood were treated with the mixture of Example 3. After about an hour the cotton fabric was rinsed under running water and followed by gentle rubbing by hand until most of the stain was removed. A second application resulted in the stain being almost completely removed. After about an hour the stain on polyester was completely removed by rinsing under running water with gentle rubbing by hand.

Example 10. Mustard

Samples of both cotton and polyester fabric stained with mustard were treated with the mixture of Example 3 with the same results as above.

Example 11. Cleanser for Bicycle Dirt & Grease

Samples of both cotton and polyester fabric stained with dirty bicycle chain grease were treated with the mixture of Example 3. After about 1 hour the stain was found to be completely removed after rinsing under water with gentle rubbing by hand.

Example 12. Polyurethane

A 4 in² section of glossy floorboard prefinished with polyurethane was treated with the mixture of Example 3. After about an hour the treated area was scrubbed using a plastic brush and rinsed under running water with rubbing by hand. The treated area appeared to be unaffected by the treatment and appeared as glossy as before treatment. A second treatment was applied except the contact time was increased to about 24 hours. Again, the treated area appeared to be unaffected by the treatment and appeared as glossy as before treatment.

Example 13. Cleanser for Silicone-Based Chairlift Grease

A nylon ski jacket heavily soiled with silicone-based chairlift grease was treated with a liberal amount of the mixture of Example 3. After about 2 hours the stain was completely removed after rinsing with water.

Example 14. Cleanser for Cooking Oil Stain

A shirt (92% polyester & 8% spandex) stained with olive oil was treated with the mixture of Example 3. After 10 minutes it was rinsed and the stain was completely removed.

Example 15. Cleanser for Facial Makeup

A shirt collar stained with Clinique liquid foundation was treated with the mixture of Example 3. After about 15 minutes it was rinsed and the stain was completely removed.

Example 16. Wine Stain Remover

Red wine was applied to a dish towel was treated by immediate application of the mixture of Example 3. After about 10 minutes it was rinsed and the wine was completely removed.

The invention has been described with reference to the preferred embodiments without limit thereto. Additional embodiments and improvements may be realized which are not specifically set forth herein but which are within the scope of the invention as more specifically set forth in the claims appended hereto.

The invention claimed is:

1. A method of cleaning a surface comprising:
providing a cleaning system comprising:
a liquid comprising:
4-50 wt % glyceride wherein said glyceride is the condensation reaction product of at least 1.10 moles of a mixture of acids to no more than 2.1 moles of said mixture of acids per mole of glycerin;
wherein said mixture of acids comprises:
at least 0.275 to no more than 0.990 moles of a first acid comprising a branched acid with 16-20 aliphatic carbons;
at least 0.250 to no more than 0.810 moles of a second acid comprising an alkyl acid with 9-11 carbons; and
at least 0.250 to no more than 0.810 moles of a third acid comprising an alkyl acid with 7-9 carbons wherein said third acid has a lower molecular weight than said second acid; and
6-45 wt % surfactant; and
up to 90 wt % solvent;
applying said cleaning system to a surface comprising a material to be removed; and
removing said cleaning system.

2. The method of cleaning a surface of claim 1 wherein said surface is selected from the group consisting of a porous surface, a metal surface, a painted surface, a natural surface, a synthetic fabric surface and a smooth surface.

3. The method of cleaning a surface of claim 1 wherein said surface is selected from the group consisting of concrete, a ceramic surface and a cellulose-based surface.

4. The method of cleaning a surface of claim 1 wherein said material to be removed is selected from the group consisting of graffiti, grass, dirt, food products, greases, oils, soils and stains.

5. The method of cleaning a surface of claim 1 wherein said material to be removed is selected from the group consisting of grass, dirt, food product, grease, oil and soil.

6. The method of cleaning a surface of claim 1 wherein said mixture of acids comprises
at least 0.425 to no more than 0.810 moles of said third acid comprising an alkyl acid with 7-9 carbons wherein said third acid has a lower molecular weight than said second acid.

7. The method of cleaning a surface of claim 1 wherein said mixture of acids comprises at least 0.425 moles of said second acid.

8. The method of cleaning a surface of claim 7 wherein said mixture of acids comprises at least 0.520 moles of said second acid.

9. The method of cleaning a surface of claim 6 wherein said mixture of acids comprises no more than 0.580 moles of said second acid.

10. The method of cleaning a surface of claim 6 wherein said mixture of acids comprises at least 0.520 moles of said third acid.

11. The method of cleaning a surface of claim 10 wherein said mixture of acids comprises no more than 0.580 moles of said third acid.

12. The method of cleaning a surface of claim 1 further comprising 5-90 wt % cleaning agent.

13. The method of cleaning a surface of claim 12 wherein said cleaning agent is selected from the group consisting of esters, propylene carbonates, terpenes, N-methylpyrrolidone, acetates, and ethers.

14. The method of cleaning a surface of claim 12 wherein said cleaning agent is selected from the group consisting of alkyl esters with up to 5 carbons which may be substituted; cyclic terpenes; dipropylene glycol methyl ether acetate, dipropylene glycol monomethyl ether acetate, diethylene glycol monoethyl ether acetate, ethyl acetate, n-propyl acetate, n-butyl acetate, isobutyl acetate, dipropylene glycol methyl ether, and diethylene glycol ethyl ether.

15. The method of cleaning a surface of claim 14 wherein said cleaning agent is selected from the group consisting of methyl ester, 3-ethoxypropionic ethyl ester, ethyl lactate, soy methyl ester, triglyceride methyl ester, $C_{1-4}$ alkyl ester of a $C_{6-22}$ saturated or unsaturated carboxylic acid, and limonene.

16. The method of cleaning a surface of claim 1 wherein said liquid has a Brookfield Yield Value (BYV) of at least 50 dyn/cm².

17. The method of cleaning a surface of claim 16 wherein said BYV is at least 100 dyn/cm².

18. The method of cleaning a surface of claim 16 wherein said BYV does not exceed 100,000 dyn/cm².

19. The method of cleaning a surface of claim 1 wherein said cleaning system comprises:
10 to 30 wt % said glyceride;
20-40 wt % said solvent;
30-70 wt % of a cleaning agent; and
and up to 40 wt % water.

20. The method of cleaning a surface of claim 1 wherein said cleaning system comprises less than 2 wt % sulfate-based surfactant.

21. The method of cleaning a surface of claim 20 wherein said cleaning system comprises less than 1 wt % sulfate-based surfactant.

22. The method of cleaning a surface of claim 1 wherein said surfactant is selected from the group consisting of a cationic surfactant, an anionic surfactant, a nonionic surfactant and an amphoteric surfactant.

23. The method of cleaning a surface of claim 22 wherein said surfactant is selected from the group consisting of quaternized polysaccharides, alkyl polysaccharides, alkoxylated amines, alkoxylated ether amines, phospholipids, and mixtures thereof.

24. The method of cleaning a surface of claim 22 wherein said surfactant is selected from the group consisting of alkanoyl isethionates, alkyl succinates, alkyl sulphosuccinates, N-alkoyl sarcosinates, alkyl phosphates, alkyl ether phosphates, alkyl ether carboxylates, alpha-olefin sulphonates wherein alkyl and acyl groups are comprise 8 to 18 carbons and may be unsaturated.

25. The method of cleaning a surface of claim 22 wherein said surfactant is selected from the group consisting of sodium, magnesium, ammonium and mono-, di- and triethanolamine salts of alpha-olefin sulphonates.

26. The method of cleaning a surface of claim 22 wherein said surfactant is selected from the group consisting sodium oleyl succinate, ammonium lauryl sulphosuccinate, disodium laureth sulfosuccinate, sodium dodecylbenzene sulphonate, triethanolamine dodecylbenzene sulphonate, sodium cocoyl isethionate, sodium lauroyl isethionate, sodium N-lauryl sarcosinate, sodium lauroyl lactylate and sodium lauriminodipropionate.

27. The method of cleaning a surface of claim 26 wherein said surfactant is sodium lauriminodipropionate.

28. The method of cleaning a surface of claim 22 wherein said surfactant is selected from the group consisting of polyethylene glycol surfactants and glucoside surfactants either alone or as mixtures.

29. The method of cleaning a surface of claim 22 wherein said surfactant is selected from the group consisting polyalkylene glycol adducts of alkyl C8-C24 phenols; polyalkylene glycol adducts of C8-C30 alcohols or C8-C30 glycosides, linear or branched, saturated or unsaturated; polyalkylene glycol adducts of C8-C30, linear or branched, saturated or unsaturated fatty acid amides; C8-C30 linear or branched, saturated or unsaturated esters of sorbitol; fatty acid esters of sucrose; C8-C30 alkyl polyglycosides; C8-C30 alkenyl polyglycosides, which are optionally polyalkylene glycol adducts with from 0 to 10 polyalkylene glycol units and comprising from 1 to 15 glucose units; polyalkylene glycol adducts of saturated or unsaturated vegetable oils; derivatives of N-alkyl (C8-C30) glucamine; derivatives of N-acyl C8-C30 methylglucamine; aldobionamides; amine oxides; polyalkylene glycol adducts of silicones; polyglycerin adducts of lauryl alcohol containing 1-7 moles of glycerin; polyglycerin adducts of oleyl alcohol containing 1-7 moles of glycerin; polyglycerin adducts of cetearyl alcohol containing 1-7 moles of glycerin; polyglycerin adducts of octadecanol containing 1-7 moles of glycerin.

30. The method of cleaning a surface of claim 22 wherein said surfactant is selected from the group consisting of decyl glucoside, lauryl glucoside, caprylic/capric glucoside and coco glucoside.

31. The method of cleaning a surface of claim 22 wherein said surfactant is selected from the group consisting of cocamidopropyl betaine, cocobetaine, sodium salt of diethylaminopropyl laurylaminosuccinamate or mixtures thereof.

32. The method of cleaning a surface of claim 1 wherein said surfactant is selected from the group consisting of disodium laureth sulfosuccinate, decyl glucoside sodium lauroyl lactylate and sodium lauriminodipropionate.

33. The method of cleaning a surface of claim 29 wherein said glyceride comprises the reaction product of glycerin with isostearic acid, octanoic acid and decanoic acid.

34. A method of cleaning a surface comprising:
providing cleaning system comprising:
a liquid comprising:
4-50 wt % glyceride wherein said glyceride is the condensation reaction product of at least 1.10 moles of a mixture of acids to no more than 2.1 moles of said mixture of acids per mole of glycerin;
wherein said mixture of acids comprises:
at least 0.275 to no more than 0.990 moles of a first acid comprising a branched acid with 16-20 aliphatic carbons;
at least 0.250 to no more than 0.810 moles of a second acid comprising an alkyl acid with 9-11 carbons; and
at least 0.250 to no more than 0.810 moles of a third acid comprising an alkyl acid with 7-9 carbons wherein said third acid has a lower molecular weight than said second acid; and
6-45 wt % surfactant;
5-90 wt % soy methyl ester; and
up to 90 wt % solvent;
applying said cleaning system to a surface comprising a material to be removed; and
removing said cleaning system.

35. The method of cleaning a surface of claim 34 wherein said surface is selected from the group consisting of a porous surface, a metal surface, a painted surface, a natural surface, a synthetic fabric surface and a smooth surface.

36. The method of cleaning a surface of claim 34 wherein said surface is selected from the group consisting of concrete, a ceramic surface and a cellulose-based surface.

37. The method of cleaning a surface of claim 34 wherein said material to be removed is selected from the group consisting of graffiti, grass, dirt, food products, greases, oils, soils and stains.

38. The method of cleaning a surface of claim 34 wherein said material to be removed is selected from the group consisting of grass, dirt, food product, grease, oil and soil.

39. The method of cleaning a surface of claim 34 wherein said mixture of acids comprises
at least 0.425 to no more than 0.810 moles of said third acid comprising an alkyl acid with 7-9 carbons wherein said third acid has a lower molecular weight than said second acid.

40. The method of cleaning a surface of claim 34 wherein said mixture of acids comprises at least 0.425 moles of said second acid.

41. The method of cleaning a surface of claim 40 wherein said mixture of acids comprises at least 0.520 moles of said second acid.

42. The method of cleaning a surface of claim 41 wherein said mixture of acids comprises no more than 0.580 moles of said second acid.

43. The method of cleaning a surface of claim 39 wherein said mixture of acids comprises at least 0.520 moles of said third acid.

44. The method of cleaning a surface of claim 43 wherein said mixture of acids comprises no more than 0.580 moles of said third acid.

45. The method of cleaning a surface of claim 34 wherein said liquid has a BYV of at least 50 dyn/cm$^2$.

46. The method of cleaning a surface of claim 45 wherein said BYV is at least 100 dyn/cm$^2$.

47. The method of cleaning a surface of claim 45 wherein said BYV does not exceed 100,000 dyn/cm$^2$.

48. The method of cleaning a surface of claim 34 wherein said cleaning system comprises:
10 to 30 wt % said glyceride;
20-40 wt % said surfactant;
30-70 wt % said soy methyl ester; and
and up to 40 wt % water.

49. The method of cleaning a surface of claim 34 wherein said cleaning system comprises less than 2 wt % sulfate-based surfactant.

50. The method of cleaning a surface of claim 49 wherein said cleaning system comprises less than 1 wt % sulfate-based surfactant.

51. The method of cleaning a surface of claim 34 wherein said surfactant is selected from the group consisting of a cationic surfactant, an anionic surfactant, a nonionic surfactant and an amphoteric surfactant.

52. The method of cleaning a surface of claim 51 wherein said surfactant is selected from the group consisting of quaternized polysaccharides, alkyl polysaccharides, alkoxylated amines, alkoxylated ether amines, phospholipids, and mixtures thereof.

53. The method of cleaning a surface of claim 51 wherein said surfactant is selected from the group consisting of alkanoyl isethionates, alkyl succinates, alkyl sulphosuccinates, N-alkoyl sarcosinates, alkyl phosphates, alkyl ether phosphates, alkyl ether carboxylates, alpha-olefin sulphonates wherein alkyl and acyl groups are comprise 8 to 18 carbons and may be unsaturated.

54. The method of cleaning a surface of claim 51 wherein said surfactant is selected from the group consisting of sodium, magnesium, ammonium and mono-, di- and triethanolamine salts of alpha-olefin sulphonates.

55. The method of cleaning a surface of claim 51 wherein said surfactant is selected from the group consisting sodium oleyl succinate, ammonium lauryl sulphosuccinate, disodium laureth sulfosuccinate, sodium dodecylbenzene sulphonate, triethanolamine dodecylbenzene sulphonate, sodium cocoyl isethionate, sodium lauroyl isethionate, sodium N-lauryl sarcosinate, sodium lauroyl lactylate and sodium lauriminodipropionate.

56. The method of cleaning a surface of claim 55 wherein said surfactant is sodium lauriminodipropionate.

57. The method of cleaning a surface of claim 51 wherein said surfactant is selected from the group consisting of polyethylene glycol surfactants and glucoside surfactants either alone or as mixtures.

58. The method of cleaning a surface of claim 51 wherein said surfactant is selected from the group consisting polyalkylene glycol adducts of alkyl C8-C24 phenols; polyalkylene glycol adducts of C8-C30 alcohols or C8-C30 glycosides, linear or branched, saturated or unsaturated; polyalkylene glycol adducts of C8-C30, linear or branched, saturated or unsaturated fatty acid amides; C8-C30 linear or branched, saturated or unsaturated esters of sorbitol-fatty acid esters of sucrose; C8-C30 alkyl polyglycosides; C8-C30 alkenyl polyglycosides, which are optionally polyalkylene glycol adducts with from 0 to 10 polyalkylene glycol units and comprising from 1 to 15 glucose units; polyalkylene glycol adducts of saturated or unsaturated vegetable oils; derivatives of N-alkyl (C8-C30) glucamine; derivatives of N-acyl C8-C30 methylglucamine; aldobionamides; amine oxides; polyalkylene glycol adducts of silicones; polyglycerin adducts of lauryl alcohol containing 1-7 moles of glycerin; polyglycerin adducts of oleyl alcohol containing 1-7 moles of glycerin; polyglycerin adducts of cetearyl alcohol containing 1-7 moles of glycerin; polyglycerin adducts of octadecanol containing 1-7 moles of glycerin.

59. The method of cleaning a surface of claim 51 wherein said surfactant is selected from the group consisting of decyl glucoside, lauryl glucoside, caprylic/capric glucoside and coco glucoside.

60. The method of cleaning a surface of claim 51 wherein said surfactant is selected from the group consisting of cocamidopropyl betaine, cocobetaine, sodium salt of diethylaminopropyl laurylaminosuccinamate or mixtures thereof.

61. The method of cleaning a surface of claim 34 wherein said surfactant is selected from the group consisting of disodium laureth sulfosuccinate, decyl glucoside sodium lauroyl lactylate and sodium lauriminodipropionate.

62. The method of cleaning a surface of claim 34 wherein said glyceride comprises the reaction product of glycerin with isostearic acid, octanoic acid and decanoic acid.

63. The method of cleaning a surface of claim 34 wherein said cleaning system comprises 5-90 wt % said soy methyl ester.

64. The method of cleaning a surface of claim 63 wherein said cleaning system comprises 30-70 wt % said soy methyl ester.

* * * * *